United States Patent [19]

Ohshima et al.

[11] 4,342,589

[45] Aug. 3, 1982

[54] PROCESS FOR PREPARING IRON COMPOUND PARTICLES FOR USE IN MAGNETIC RECORDING

[75] Inventors: Kazushi Ohshima, Yokohama; Mitsuro Matsunaga, Kamakura; Haruo Sekiguchi, Chigasaki; Kazuhiro Imaoka, Kamakura; Fujio Hayashi, Yokohama, all of Japan

[73] Assignee: Mitsui Toatsu Chemicals, Inc., Tokyo, Japan

[21] Appl. No.: 230,024

[22] Filed: Jan. 30, 1981

[30] Foreign Application Priority Data

Feb. 5, 1980 [JP] Japan ................................. 55-11999

[51] Int. Cl.$^3$ ........................... C22B 5/02; H01F 1/00
[52] U.S. Cl. ........................... 75/0.5 BA; 75/0.5 AA; 148/105; 252/62.55; 252/62.56; 252/62.62; 252/62.63
[58] Field of Search ............... 252/62.55, 62.56, 62.62, 252/62.63; 75/0.5 AA, 0.5 BA; 148/105

[56] References Cited

U.S. PATENT DOCUMENTS

| | | | |
|---|---|---|---|
| 3,912,646 | 10/1975 | Leitner et al. | 252/62.56 |
| 4,255,492 | 3/1981 | Audran et al. | 252/62.56 X |
| 4,259,368 | 3/1981 | Rudolf et al. | 252/62.56 |

FOREIGN PATENT DOCUMENTS

| | | | |
|---|---|---|---|
| 52-134858 | 11/1977 | Japan . | |
| 54-122663 | 9/1979 | Japan . | |
| 2016526 | 9/1979 | United Kingdom | 75/0.5 BA |

*Primary Examiner*—Jack Cooper
*Attorney, Agent, or Firm*—Fisher, Christen & Sabol

[57] ABSTRACT

Disclosed is a process for preparing fine needle-like, ferromagnetic iron compound particles for use in magnetic recording in which needle-like iron oxyhydroxide fine particles prepared by simultaneously co-precipitating or cladding iron compound particles with an element of group II of the Periodic Table and manganese at atomic weight ratios of the element of group II of the Periodic Table and manganese to iron of from 0.001/100 to 10/100 and 0.005/100 to 10/100 respectively are reduced and/or oxidized under heating.

5 Claims, No Drawings

PROCESS FOR PREPARING IRON COMPOUND PARTICLES FOR USE IN MAGNETIC RECORDING

BACKGROUND OF THE INVENTION (1) Field of the Invention

This invention relates to a process for preparing fine particles of ferromagnetic iron compounds, particularly ferromagnetic iron oxides for use in magnetic recording such as $Fe_3O_4$, $\gamma$-$Fe_2O_3$, or $\alpha$-Fe metal.

(2) Description of the Prior Art

Magnetic characteristics required for magnetic materials used in magnetic recording are that they have a high magnetic coercive force, that both saturated susceptibility ($\sigma s$) and residual susceptibility ($\sigma r$) are high, and that the squareness ratio ($R = r/\sigma s$) is large. It is advantageous for iron series ferromagnetic compounds to have a fine needle-like particle form in order to satisfy such magnetic characteristics. Various processes for the preparation of needle-like iron oxyhydroxide particles or needle-like iron oxide particles have been disclosed. For example, Japaenese Pat. No. 166146 discloses a process for preparing needle-like iron oxyhydroxide particles in which $FeSO_4 \cdot 7H_2O$ as a starting material is neutralized with NaOH, and then subjected to air oxidation and a seeding crystallization process.

According to the conventional processes for the preparation of needle-like iron compounds, however, in the case where (a) fine needle-like iron oxyhydroxide particles are subjected to catalytic reaction with a reducing gas to form needle-like $Fe_3O_4$ particles, (b) the needle-like $Fe_3O_4$ particles are treated with an oxidizing gas to form needle-like $\gamma$-$Fe_2O_3$, and (c) fine needle-like iron oxyhydroxide particles and/or iron oxide particles are subjected to catalytic reaction with a reducing gas to form $\alpha$-Fe particles, the catalytic reaction of these particles as starting materials with an oxidizing gas and/or reducing gas inevitably causes the breakage and sintering of the particles even if the majority of these particles has a fine needle-like form. Consequently, marked deterioration in magnetic characteristics of the particles results. There is a lowering in magnetic coercive force, saturated susceptibility, residual susceptibility, and squareness ratio such that the properties required for the ferromagnetic iron compound for use in magnetic recording are greatly impaired.

For the purpose of overcoming the problems in the conventional processes as above, for example, Japanese Patent Laid-Open Publication No. 122663/'79 discloses a process for preparing iron compound particles for use in magnetic recording which comprises cladding iron oxyhydroxide, iron oxide, or a composition prepared by doping thereto a metal such as cobalt, manganese, or nickel with a compound of one or more than one of zinc, chromium, and copper, drying, and reducing the resulting product at a temperature of from 200° to 600° C. under a reducing gas stream. The problems in the conventional processes described above, however, can not be solved satisfactorily even if the above process is effected.

SUMMARY OF THE INVENTION

An object of this invention is to provide a process for preparing iron compound particles for use in magnetic recording which have excellent magnetic characteristics.

Another object of this invention is to provide an improved process for preparing needle-like iron oxyhydroxide compound particles which are suitable for the preparation of iron compound particles for use in magnetic recording and which have excellent magnetic characteristics.

A further object of this invention is to eliminate the deterioration of magnetic characteristics due to the breakage and sintering of particles developed during the preparation of iron compound particles for use in magnetic recording medium by the reduction and oxidation of needle-like iron oxyhydroxide compound particles under heating, and consequently to provide fine particles of ferromagnetic iron oxides such as $Fe_3O_4$ and $\gamma$-$Fe_2O_3$, or iron metal such as $\alpha$-Fe for use in magnetic recording which have excellent magnetic characteristics such as magnetic coercive force (Hc), saturated susceptibility ($\sigma s$), residual susceptibility ($\sigma r$), and squareness ratio.

One object of this invention as described above is achieved by simultaneously co-precipitating or cladding iron compound particles with one or more than one element selected from the elements of group II of the Periodic Table and manganese at atomic weight ratios of the element or elements of group II of the Periodic Table and manganese to iron of from 0.001/100 to 10/100 and 0.005/100 to 10/100 respectively. Other objects of this invention are achieved by reducing and or oxidizing needle-like iron oxyhydroxide compound particles thus obtained under heating by the conventional procedure to form iron compound particles for use in magnetic recording.

DESCRIPTION OF THE PREFERRED EMBODIMENTS

This invention has been made based on such findings that fine needle-like iron oxyhydroxide compound particles, which are prepared by simultaneously co-precipitating or cladding iron compound particles with one or more than one elements selected from the element of group II of the Periodic Table and manganese as the secondary component in the range of from a trace amount to a small amount, are highly suitable as the starting material for producing ferromagnetic iron compound particles, that is, $Fe_3O_4$, $\gamma$-$Fe_2O_3$ and particularly $\alpha$-Fe particles for use in magnetic recording. The use of the fine needle-like iron oxyhydroxide compound particles makes it possible to obtain ferromagnetic iron compounds having a good particle form with a high degree of needle-like form. Therefore, the term represented by iron compound particles for use in magnetic recording includes iron particles for use in magnetic recording which substantially consist of iron metal with an element of group II of the Periodic Table and manganese.

The function and mechanism of the element of group II of the Periodic Table and manganese co-presenting therewith are not fully clear. However they are qualitatively explained by the co-existence of the element of group II of the Periodic Table and manganese which functions to increase the heat resistant characteristics during the reduction and/or oxidation reactions of fine needle-like iron oxyhydroxide particles. Consequently, the property of particle form retention is improved.

The element of group II of the Periodic Table used in the present invention may be any single element or a combination of the elements of group II of the Periodic Table, preferably calcium and/or barium and/or zinc, or a combination of more than one element thereof with excellent effect.

The total amount of the elements of group II of the Periodic Table is in an atomic weight ratio thereof to iron of from 0.001/100 to 10/100, preferably 0.01/100 to 5/100, more preferably 0.05/100 to 1/100.

The amount of manganese is in an atomic weight ratio thereof to iron of from 0.005/100 to 10/100, preferably 0.01/100 to 5/100, more preferably 0.05/100 to 5/100. When the contents of the element of group II of the Periodic Table and manganese are less than those within the above ranges respectively, the effect due to the introduction of these secondary components is not so marked as above. When the contents are above those within the above ranges respectively, the preparation of fine needle-like iron oxyhydroxide compound particles is liable to become difficult, and in most cases there is usually such a great tendency that only hydrous $Fe_3O_4$ spherical particles or Green Rust particles are formed.

As the element source of the element of group II of the Periodic Table and manganese used in the present invention, compounds of various nitrates, sulfates, carbonates, or mineral acid salts may be used. There are no limitations to the form of the compound. Generally, the above compounds are mostly insoluble in water. Unexpectedly, the marked effect of the present invention can be produced even by the use of an almost non-water soluble compound for the preparation of fine needle-like iron oxyhydroxide compound particles by the wet neutralization and oxidation reactions as described below.

The method employed for introducing the element of group II of the Periodic Table and maganese may be one of the following modifications of the conventional process for production of fine needle-like iron oxyhydroxide compound particles by the so-called wet neutralization and oxidation reactions. In the conventional process, an alkali agent is introduced into an aqueous solution of a ferrous salt or a mixture of a ferrous salt and ferric salt to effect a neutralization reaction and an oxidation reaction simultaneously therewith or consequently thereto for the formation of fine needle-like iron oxyhydroxide compound particles. A method of introducing a compound of the element of group II of the Periodic Table and a compound of manganese may be (1) by the addition thereof to an aqueous solution of an iron salt followed by the co-precipitation process with an alkali agent, (2) by the introduction thereof into the reaction system at the completion of the neutralization reaction of an iron salt with an alkali agent to be cladded therewith, (3) by the addition thereof into the reaction system at the completion of the oxidation reaction to be cladded on the surface of the particles, or (4) by mixing the compounds with dried or sintered fine needle-like iron oxyhydroxide compound particles mechanically with a pulverizer to be cladded therewith. Any method described above can produce the effect of the present invention. Accordingly, cladding used in the present invention includes the introduction of the above metal elements into the aforesaid particles by adhesion, adsorption, deposition, or precipitation.

Examples of the ferrous salt used in the present invention include sulfates, chlorides, or various mineral acid salts, which may be employed singly or in a combination of more than one salt, sulfates being the most preferably used. Examples of the ferric salt include sulfates, nitrates, carbonates, chlorides, and various mineral acid salts. In the case where sulfates are used as the ferrous salt, a preferable ferric salt combined therewith is a sulfate and/or a nitrate without being limited thereto. Examples of the alkali agent used in the present invention include alkali hydroxides such as potassium hydroxide and sodium hydroxide, alkali carbonates such as potassium carbonate and sodium carbonate, an aqueous ammonia solution, and substances having substantially the same action as ammonia as the result of the thermal decomposition by heating an aqueous solution thereof, such as urea. The selection of the alkali agents described above is not essential for the practice of the present invention.

Examples of various operating factors, which have a delicate effect on the form of needle-like iron oxyhydroxide compound particles as the final product, include the type, amount, and aqueous concentration of the iron salt; the type, and amount of a compound of the element of group II of the Periodic Table; the type and amount of a compound of manganese; the type, amount, and aqueous concentration of the alkali agent; the temperature and reaction time at the neutralization reaction stage; the temperature, amount of air supplied, rate, and time for conducting the oxidation reaction; and the like. The effect produced by introducing thereinto as a secondary component a compound of the element of group II of the Periodic Table and a compound of manganese prior to the oxidation reaction is usually complicated and diversified. Generally speaking, however, the temperature of the neutralization and oxidation reactions is set at a temperature of from 5° to 15° C. above, and, if required, the amount of air supplied is set at a level of from 30 to 60% more in comparison with the conventional case where the compound of the element of group II of the Periodic Table and the compound of manganese are not employed to obtain iron oxyhydroxide particles having substantially the same particle form.

The needle-like iron oxyhydroxide compound particles formed by the neutralization and oxidation reactions are washed with water and filtered, and thereafter air dried normally at a temperature of from 100° to 150° C., if required, pulverized or granulated to obtain a dried needle-like iron oxyhydroxide compound particle powder. As the case may be, the powder thus obtained may be subjected to sintering at a temperature of from 250° to 300° C. to obtain a sintered needle-like iron oxyhydroxide compound particle powder.

The preparation of ferromagnetic iron oxide ($Fe_3O_4$ and $\gamma$-$Fe_2O_3$) and/or ferromagnetic metal iron ($\alpha$-Fe) particles from the dried or sintered needle-like iron oxyhydroxide compound particle powder can be effected similarly to the conventional procedure. That is, for example, the dried or sintered needle-like iron oxyhydroxide compound particle powder is packed in a steel reactor tube which is externally temperature controllable and which is equipped with a preheater for a starting gas for the reaction. A reducing gas is introduced thereinto at a temperature of from 300° to 500° C., as the case may be, with an appropriate amount of water entrained therewith for catalytic reaction to obtain $Fe_3O_4$ particle powder. This is followed by introducing an oxidizing gas at a temperature of from 200° to 400° C. for catalytic reaction to obtain $\alpha$-$Fe_2O_3$ particle powder. The catalytic reduction reaction with a reducing gas at a temperature of from 200° to 500° C. with the same reactor tube as above makes it possible to obtain $\alpha$-Fe fine particle powder directly from the dried or sintered needle-like iron oxyhydroxide compound particle powder, or from the aforesaid $Fe_3O_4$ or $\gamma$-$Fe_2O_3$ particle powder. The oxidation or reduction reaction may be effected in a fixed bed or a moving bed under atmospheric pressure or elevated pressures. Normally, no severe limitations are necessary on the amount and feed rate of the starting gas for reaction, but the feed rate is suitably in the range of from 0.1 to 100 Nl/gr—Fe/hr, preferably 5 to 50 Nl/gr—Fe/hr in terms of gaseous hour space velocity (GHSV). A gaseous hour space velocity less than the lower limit of the above range retards the proceeding of the reaction too much to be practical. A gaseous hour space velocity more than the upper limit increases the pressure drop within the reaction system to be unsuitable for reaction procedures. When the reaction temperature range is outside the aforesaid range, that is, in the lower temperature range, the reaction rate is so low that it takes too much time for the completion of the reaction to be practical. In the higher temperature range, too high a reaction rate has a great tendency to cause unnecessary breakage or sintering of particles.

The observation with an electron microscope of high magnifying power of the form of ferromagnetic iron oxide ($Fe_3O_4$ and $\gamma$-$Fe_3O_2$) and metal iron ($\alpha$-Fe) fine particles obtained by the aforesaid gas-liquid catalytic reaction from needle-like iron oxyhydroxide compound particles containing the element of group II of the Periodic Table and manganese as a secondary component in accordance with the process of the present invention shows that the form of the aforesaid product particles retains almost completely the form of needle-like iron oxyhydroxide fine particles employed as the starting material with little or no phenomena such as breakage and interparticle crosslinking or sintering of particles. With respect to magnetic coercive force (Hc), for example, of the magnetic characteristics of ferromagnetic iron compounds, the product particle has a high Hc, such as in the range of from 350 to 550 Oe in the case of $Fe_3O_4$ and $\gamma$-$Fe_2O_3$, and from 1000 to 1500 Oe in the case of $\alpha$-Fe. The Hc may vary depending on the particle size and needle-like form ratio. The particle has satisfactory properties required for a ferromagnetic iron compound for use in a magnetic recording medium.

Thus, needle-like iron oxyhydroxide fine particles according to the present invention have remarkably improved heat-resistant characteristics, and $\alpha$-Fe with good needle-like form can be obtained. The use of $\alpha$-Fe thus obtained as a magnetic recording medium makes it possible to obtain a magnetic recording tape, and a magnetic recording card which are capable of a highly densified recording, which is required recently. A remarkable improvement in the recording characteristics in the high frequency region is also obtained.

The present invention will be described in more detail by the following Examples and Comparative Examples.

EXAMPLE 1

A. Preparation of calcium and manganese containing iron oxyhydroxide particles

To 20 l of water warmed up to 55° C., 100 gr of $FeSO_4.7H_2O$ is introduced to form an aqueous solution. To the aqueous solution, an aqueous solution at 55° C. prepared by dissolving 10 gr of $Ca(NO_3)_2.4H_2O$ and 12 gr of $Mn(NO_3)_2.6H_2O$ in 200 ml of water is added and mixed with agitation for 10 minutes. To the resulting mixture, an aqueous solution at 55° C. separately prepared by dissolving 300 gr of sodium hydroxide in 1000 ml of water is added and mixed with agitation for 50 minutes to complete the neutralization reaction. The resulting system is wholly heated up to 70° C., and air is introduced thereinto at a feed rate of 120 Nl/min to start the oxidation reaction. After 7 hours' oxidation reaction a yellow iron oxyhydroxide is obtained as an insoluble precipitate.

The resulting system is cooled to room temperature, washed with water, and filtered by suction to obtain a Ca-Mn-modified iron oxyhydroxide particle paste. The paste is dried over night at 110° C. to obtain Ca-Mn-containing dried iron oxyhydroxide particle solid material. The solid material is ground with a wood hammer to a granular material of from 6 to 12 mesh to obtain calcium and manganese containing dried iron oxyhydroxide granular material.

The result of observation of the granular material at a magnification of 50000 diameters shows that uniformly shaped needle-like fine particles having a minimum unit with a longitudinal axis of from 0.3 to 0.5 micron and a transverse axis of from 0.03 to 0.05 micron are obtained.

B. Preparation and evaluation of calcium and manganese containing $Fe_3O_4$ magnetic material particles To a steel reactor tube having an inner diameter of 1.5 inches, uniformly heat controllable in the longitudinal axial direction with a fluidized bath of silicon carbide particles, and fitted with a preheater for reaction gas, 100 gr of calcium and manganese containing needle-like iron oxyhydroxide fine particle granular material is packed. Hydrogen gas is introduced thereinto at a feed rate of 600 Nl/hr for effecting reduction at 398° C. to obtain calcium and manganese containing $Fe_3O_4$ particle granular material. The particle form, observed by an electron microscope, of the Ca-Mn containing $Fe_3O_4$ particle granular material is that of fine needle-like particles having a minimum particle unit with a longitudinal axis of from 0.3 to 0.5 micron and a transverse axis of from 0.03 to 0.05 micron. The form of the minimum particle unit of calcium and manganese containing iron oxyhydroxide particle granular material used as the starting material is well retained without producing any breakage or sintering of the particle. The result of the evaluation of magnetic characteristics of the calcium and manganese containing $Fe_3O_4$ particle granular material shows that Hc is 522 Oe, $\sigma$s is 79.9 emu/gr, and R is 0.52.

C. Preparation and evaluation of Ca-Mn-containing $Fe_2O_3$ magnetic material particles The Ca-Mn-containing $Fe_3O_4$ particle granular material is subjected to air oxidation at 300° C. with a hot air circulation electric dryer to obtain Ca-Mn-containing $\gamma$-$Fe_2O_3$ particle granular material. The result of observation by an electron microscope of the minimum particle unit of the Ca-Mn-containing $\gamma$-$Fe_2O_3$ shows that the minimum particle unit has a needle-like particle form with mainly a longitudinal axis of from 0.3 to 0.5 micron and a transverse axis of from 0.03 to 0.05 micron without producing any breakage or sintering of the particle, and exactly retains the form of the minimum particle unit of Ca-Mn-containing needle-like $Fe_3O_4$ particle granular material used as the starting material.

The magnetic characteristics of the Ca-Mn-containing $\gamma$-$Fe_2O_3$ particle granular material shows that $H_c$ is 398 Oe, $\sigma$s is 72.4 emu/gr, and R is 0.52.

D. Preparation and evaluation of Ca-Mn-containing α-Fe magnetic material particles The aforesaid 1.5 inch steel reactor tube is packed with 100 gr of the aforesaid Ca-Mn-containing needle-like iron oxyhydroxide particle granular material, and hydrogen gas is introduced thereinto at a feed rate (GHSV) of 35 nl-$H_2$/gr-Fe/hr for effecting a reduction reaction at 380° C. for 10.2 hours. After the completion of the reaction, the reaction system is cooled to room temperature to collect the reduced particle granular material under nitrogen atmosphere. The result of the measurement of the X-ray diffraction pattern thereof shows 98.1% to be α-Fe crystal. The result of the observation of the particle form of the α-Fe particle granular material shows that the particle form well retains the particle form of the starting material with little or no breakage and sintering of the particle. The result of the evaluation of the magnetic characteristics of the α-Fe particle granular material shows that $H_c$ is 1321 Oe, $σ_s$ is 205.6 emu/gr, and R is 0.53.

EXAMPLES 2 to 5

A. Preparation of the element of group II of the Periodic Table-Mn-containing iron oxyhydroxide particles The element of group II of the Periodic Table-MN-containing needle-like iron oxyhydroxide particles are prepared similarly to Example 1 (A). The result is shown in Table 1.

B. Preparation and evaluation of the element of group II of the Periodic Table-Mn-containing $Fe_3O_4$ magnetic particles The element of group II of the Periodic Table-Mn-containing needle-like iron oxyhydroxide particle granular material prepared by the process of the present invention is subjected to reduction with hydrogen by the same procedure as in Example 1(B) to obtain a $Fe_3O_4$ particle granular material. The result is shown in Table 2.

C. Preparation and evaluation of the element of group II of the Periodic Table-Mn-containing $Fe_2O_3$ magnetic particles The needle-like $Fe_3O_4$ particle granular material obtained by reduction with hydrogen from the needle-like iron oxyhydroxide particle granular material prepared by the process of the present invention is subjected to air oxidation by the same procedure as in Example 1(C) to obtain γ-$Fe_2O_3$ particle granular material. The result is shown in Table 3.

TABLE 1

| Example | Starting Material Fe-Salts and Additives | | | Neutralization Reaction | | | Oxidation Reaction | | | Iron Oxyhydroxide Particles | |
|---|---|---|---|---|---|---|---|---|---|---|---|
| | Fe-salts *1 | Additives | Composition ratio(weight) | Alkali agents | Temperature (°C.) | Time (hrs.) | Air (Nl/min) | Temperature (°C.) | Time (hrs.) | Longitudinal axis (μ) | Transverse axis (μ) |
| 1-A | $FeSO_4.7H_2O$ | $Ca(NO_3)_2.4H_2O$ $Mn(NO_3)_2.6H_2O$ | Fe-Ca-Mn = 100-0.84-1.20 | NaOH | 55 | 1 | 120 | 77 | 7 | 0.3 0.5 | 0.03 0.05 |
| 2-A | $FeSO_4.7H_2O$ | $Ca(NO_3)_2.4H_2$) $Mn(NO_3)_2.6H_2O$ | Fe-Ca-Mn = 100-0.09-0.80 | NaOH | 50 | 1 | 100 | 72 | 5 | 0.3 0.4 | 0.03 0.05 |
| 3-A | $FeSO_4.7H_2O$ | $BaCl_2.2H_2O$ $Mn(NO_3)_2.6H_2O$ | Fe-Ba-Mn = 100-0.08-0.51 | $Na_2CO_3$ | 52 | 1 | 115 | 68 | 7 | 0.4 0.5 | 0.03 0.04 |
| 4-A | $FeSO_4.7H_2O$ $Fe_2(SO_4)_3.18H_2O$ | $Zn(NO_3)_2.6H_2O$ $Mn(NO_3)_2.6H_2O$ | Fe-Zn-Mn = 100-0.50-0.50 | KOH | 55 | 1 | 120 | 71 | 8 | 0.4 0.5 | 0.04 0.06 |
| 5-A | $FeSO_4.7H_2O$ | $Ca(NO_3)_2.4H_2O$ $Zn(NO_3)_2.6H_2O$ $Mn(NO_3)_2.6H_2O$ | Fe-Ca-Zn-Mn = 100-0.30-0.20 -0.15 | NaOH | 59 | 1 | 135 | 77 | 15 | 0.4 0.5 | 0.03 0.04 |

Note
*1 Example 4-A employs 900 gr of $FeSO_4.7H_2O$ and 100 gr of $Fe_2(SO_4)_3.18H_2O$ as the starting material.

TABLE 2

| Examples | Needle-like iron oxyhydroxide particle starting material | Reduction Conditions | | Form of $Fe_3O_4$ Particles | | Magnetic Characteristics of $Fe_3O_4$ Particles | | |
|---|---|---|---|---|---|---|---|---|
| | | GHSV (Nl-$H_2$/gr-Fe/hr) | T (°C.) | Longitudinal axis (μ) | Transverse axis (μ) | Hc (Oe) | $σ_s$ (emu/gr) | R |
| 1-B | Example 1-A | 9.55 | 398 | 0.3~0.5 | 0.03~0.05 | 522 | 79.9 | 0.52 |
| 2-B | Example 2-A | 20.0 | 390 | 0.3~0.4 | 0.03~0.05 | 490 | 74.8 | 0.51 |
| 3-B | Example 3-A | 20.2 | 391 | 0.4~0.5 | 0.03~0.04 | 487 | 72.9 | 0.51 |
| 4-B | Example 4-A | 20.0 | 390 | 0.4~0.5 | 0.05~0.06 | 474 | 71.7 | 0.51 |
| 5-B | Example 5-A | 20.3 | 389 | 0.4~0.5 | 0.03~0.04 | 492 | 76.3 | 0.52 |

TABLE 3

| Examples | Needle-like Fe₃O₄ particle granular material as the starting material | Oxidation reaction temperature | Form of $\gamma$-Fe$_2$O$_3$ particles Longitudinal axis ($\mu$) | Transverse axis ($\mu$) | Magnetic characteristics $\gamma$-Fe$_2$O$_3$ particles Hc, (Oe) | $\sigma_s$ (emu/gr) | R |
|---|---|---|---|---|---|---|---|
| 1-C | Example 1-B | 300 | 0.3~0.4 | 0.03~0.05 | 398 | 72.4 | 0.52 |
| 2-C | Example 2-B | 305 | 0.3~0.4 | 0.03~0.05 | 386 | 70.9 | 0.51 |
| 3-C | Example 3-B | 285 | 0.4~0.5 | 0.03~0.04 | 389 | 73.0 | 0.51 |
| 4-C | Example 4-B | 291 | 0.4~0.5 | 0.05~0.06 | 372 | 70.0 | 0.50 |
| 5-C | Example 5-B | 275 | 0.4~0.5 | 0.03~0.04 | 398 | 73.2 | 0.52 |

D. Preparation and evaluation of the element of group II of the Periodic Table-Mn-containing $\alpha$-Fe magnetic particles:

The needle-like iron oxyhydroxide particle granular material, Fe$_3$O$_4$ particle granular material, or $\gamma$-Fe$_2$O$_3$ particle granular material prepared by the process of the present invention is subjected to reduction with hydrogen to obtain needle-like $\alpha$-Fe particle granular material.

The reactor described in Example 1-D is packed with 100 gr of the particle granular material as the starting material, and hydrogen gas is passed therethrough at a feed rate (GHSV) of 35 Nl-H$_2$/gr-FE/hr for effecting a reduction reaction under the conditions of predetermined temperature and time as shown in Table 4. After the completion of the reaction, the reaction system is cooled to room temperature to collect the reduced particle granular material under a nitrogen atmosphere. The result of the measurement of the X-ray diffraction patterns thereof shows each material to be 97% or higher crystalline $\alpha$-Fe. The results for the particular form measurements and magnetic characteristics of the $\alpha$-Fe particle granular material are shown in Table 4.

ticles. However, no yellow iron oxyhydroxide particles are formed even though air oxidation is continued for a long period of time, and a black hydrous Fe$_3$O$_4$ is obtained showing a spherical form having a diameter of from 0.6 to 1.2 microns.

COMPARATIVE EXAMPLE 2

The procedure of Example 1 is repeated except that Ca(NO$_3$)$_2$.4H$_2$O and Mn(NO$_3$)$_2$.6H$_2$O are not used to obtain dried iron oxyhydroxide particle granular material having as the minimum particle unit needle-like fine particles with mainly a longitudinal axis of from 0.3 to 0.5$\mu$, and a transverse axis of from 0.03 to 0.05$\mu$, and the iron oxyhydroxide particle granular material is subjected to reduction and/or oxidation reactions under the same conditions as in Example 1 to obtain Fe$_3$O$_4$, $\gamma$-Fe$_2$O$_3$ and $\alpha$-Fe particle granular material.

The observation of the ferromagnetic iron compound particle granular material shows that (1) the Fe$_3$O$_4$ particle granular material is found to be spherical fine particles having a diameter of from 0.03 to 0.4$\mu$, and although the major portion of the fine particles shows a needle-line form with mainly a longitudinal axis of from 0.3 to 0.5$\mu$, and a transverse axis of from 0.03 to 0.05$\mu$,

TABLE 4

| Examples | Starting Material Particles | Reduction Reaction Conditions *1 Temperature (°C.) | Time (hrs.) | Degree of Reduction (%) | Form of $\alpha$-Fe Particles *2 Longitudinal axis ($\mu$) | Transverse axis ($\mu$) | Magnetic Characteristics of $\alpha$-Fe particles Hc (Oe) | $\sigma_s$ (emu/gr) | R |
|---|---|---|---|---|---|---|---|---|---|
| 1-D | Example 1-A | 380 | 10.2 | 98.1 | 0.3~0.5 | 0.03~0.04 | 1321 | 205.6 | 0.53 |
| 2-D | Example 2-A | 375 | 9.5 | 99.2 | 0.3~0.4 | 0.03~0.06 | 1290 | 195.1 | 0.51 |
| 3-D | Example 3-A | 360 | 15.0 | 98.8 | 0.4~0.5 | 0.04~0.05 | 1311 | 205.0 | 0.52 |
| 4-D | Example 4-A | 370 | 16.5 | 99.5 | 0.4~0.5 | 0.05~0.06 | 1335 | 210.6 | 0.51 |
| 5-D | Example 5-A | 396 | 7.3 | 99.0 | 0.4~0.5 * | 0.04 *~0.05 | 1351 | 219.0 | 0.50 |

Note
*1 The degree of reduction is determined by use of a calibration curve prepared mainly by the application of diffraction peak areas of X-ray diffraction patterns.
*2 A minor portion of the $\alpha$-Fe particles shown by sign * is sintered, but other major portion is of needle-like particles, so that the form of the $\alpha$-Fe particles is shown by the major longitudinal axis and transverse axis.

COMPARATIVE EXAMPLE 1

The procedure of Example 1(A) is repeated except that 150 gr of Ca(NO$_3$)$_2$.4H$_2$O and 140 gr of Mn(NO$_3$)$_2$.6H$_2$O are dissolved in 1500 ml of water with an attempt to obtain needle-like iron oxyhydroxide parthe surface of the fine particles has an unevenness of from 0.05 to 0.07$\mu$, that (2) $\gamma$-Fe$_2$O$_3$ particle granular material shows more change in the particle form than that in the aforesaid Fe$_3$O$_4$ particle granular material, and that (3) the $\alpha$-Fe particle granular material is mostly changed into spherical fine particles having a diameter of from 0.4 to $0.5\mu$ and further produces sintering. The results of the evaluation of the magnetic characteristics are shown in Table 5.

TABLE 5

| Type of magnetic material | Magnetic characteristics | | |
|---|---|---|---|
| | $H_c$ (Oe) | $\sigma_B$ (emu/gr) | R |
| $Fe_3O_4$ particles | 420 | 70.6 | 0.48 |
| $\gamma$-$Fe_2O_3$ particles | 320 | 63.0 | 0.45 |
| $\alpha$-Fe particles | 682 | 128.5 | 0.37 |

EXAMPLE 6

Fine needle-like iron oxyhydroxide particle granular material (100 gr) described in comparative Example 2, $Ca(NO_3)_2.4H_2O$, $Zn(NO_3)_2.6H_2O$ and $Mn(NO_3)_2.6H_2O$ are mixed along with water with a pulverizer at such an atomic weight ratio to Fe as to be Fe:-Ca:Zn:Mn=100:0.21:0.15:0.10 to effect the modification of iron oxyhydroxide particles by the surface treatment process. The modified iron oxyhydroxide particles are dried at 110° C. for 2 hours, and screened to a range of from 6-12 mesh to obtain a dried granular material of Ca-Zn-Mn modified needle-like iron oxyhydroxide particles.

The granular material is subjected to a reduction reaction with hydrogen under the same condition as in Example 5(D) to obtain Ca-Zn-Mn modified $\alpha$-Fe particle granular material at a degree of reduction of 97.4%. The observation by an electron microscope shows that the minimum particle unit of the $\alpha$-Fe particle granular material is composed of fine needle-like particles with mainly a longitudinal axis of from 0.3 to $0.5\mu$, and a transverse axis of from 0.03 to $0.05\mu$, and well retains the form of the minimum particle unit of the aforesaid needle-like iron oxyhydroxide particle granular material as the starting material. The $\alpha$-Fe particle granular material has such good magnetic characteristics that Hc is 1361 Oe, $\sigma$s is 209.5 emu/gr, and R is 0.51.

EXAMPLE 7

This example demonstrates that the process of the present invention is particularly advantageous for the preparation of a ferromagnetic metal iron for use in magnetic recording, that is, $\alpha$-Fe particles.

The procedure of Example 6 is repeated except that $\gamma$-$Fe_2O_3$ particle granular material, which contains to some extent spherical particles having a diameter of from 0.3 to $0.5\mu$, and shows a delicate change in form compared with the minimum unit of fine needle-like iron oxyhydroxide particles used as the starting material as described in comparative Example 2, is used as the starting material and that $Zn(NO_3)_2.6H_2O$ is not used to obtain $\gamma$-$Fe_2O_3$ particle granular material. The surface layer of the particles is modified with calcium and manganese at an atomic ratio of Fe-Ca-Mn=100:0.20:0.15. The modified granular material is subjected to reduction with hydrogen under the same conditions as in Example 5(D) to obtain $\alpha$-Fe particle granular material at a degree of reduction of 97.9%. The minimum particle unit of the $\alpha$-Fe particle granular material is composed of a small amount of spherical particles having a diameter of from 0.3 to $0.5\mu$ and needle-like particles with mainly a longitudinal axis of from 0.3 to $0.5\mu$ and a transverse axis of from 0.04 to $0.05\mu$, and having an unevenness of from 0.06 to $0.07\mu$ on the surface thereof. At the same time, an evaluation of the magnetic characteristics of the granular material shows that Hc is 1109 Oe, $\sigma$s is 157.2 emu/gr, and R is 0.49, which is a remarkable improvement compared with the magnetic characteristics of the material in comparative Example 2.

What is claimed is:

1. In a process for preparing $\alpha$-iron for use in a magnetic recording medium which comprises reducing dried and/or sintered needle-like iron oxyhydroxide particles at 200° C. to 500° C., the improvement in which said needle-like iron oxyhydroxide particles are prepared by mechanically mixing and simultaneously cladding said needle-like iron oxyhydroxide particles with manganese and one or more than one element selected from the elements of group II of the Periodic Table at atomic weight ratios of manganese and the element or elements of Group II of the Periodic Table to iron from 0.005/100 to 10/100 and 0.001/100 to 10/100, respectively.

2. A process according to claim 1 in which said atomic ratios are in the range of from 0.01/100 to 5/100 and 0.01/100 to 5/100 respectively.

3. A process according to claim 2 wherein the elements of group II of the Periodic Table are calcium and zinc.

4. A process according to claim 2 wherein said dried and/or sintered needle-like iron oxyhydroxide particles are dried in air at 100° to 150° C. and/or thereafter are calcined at 250° to 300° C.

5. A process according to claim 1, in which said atomic ratios are in the range of from 0.05/100 to 5/100 and 0.05/100 to 1/100 respectively.

* * * * *